No. 863,372. PATENTED AUG. 13, 1907.
W. R. FOX.
TYPE WRITING MACHINE.
APPLICATION FILED APR. 23, 1906.
2 SHEETS—SHEET 1.
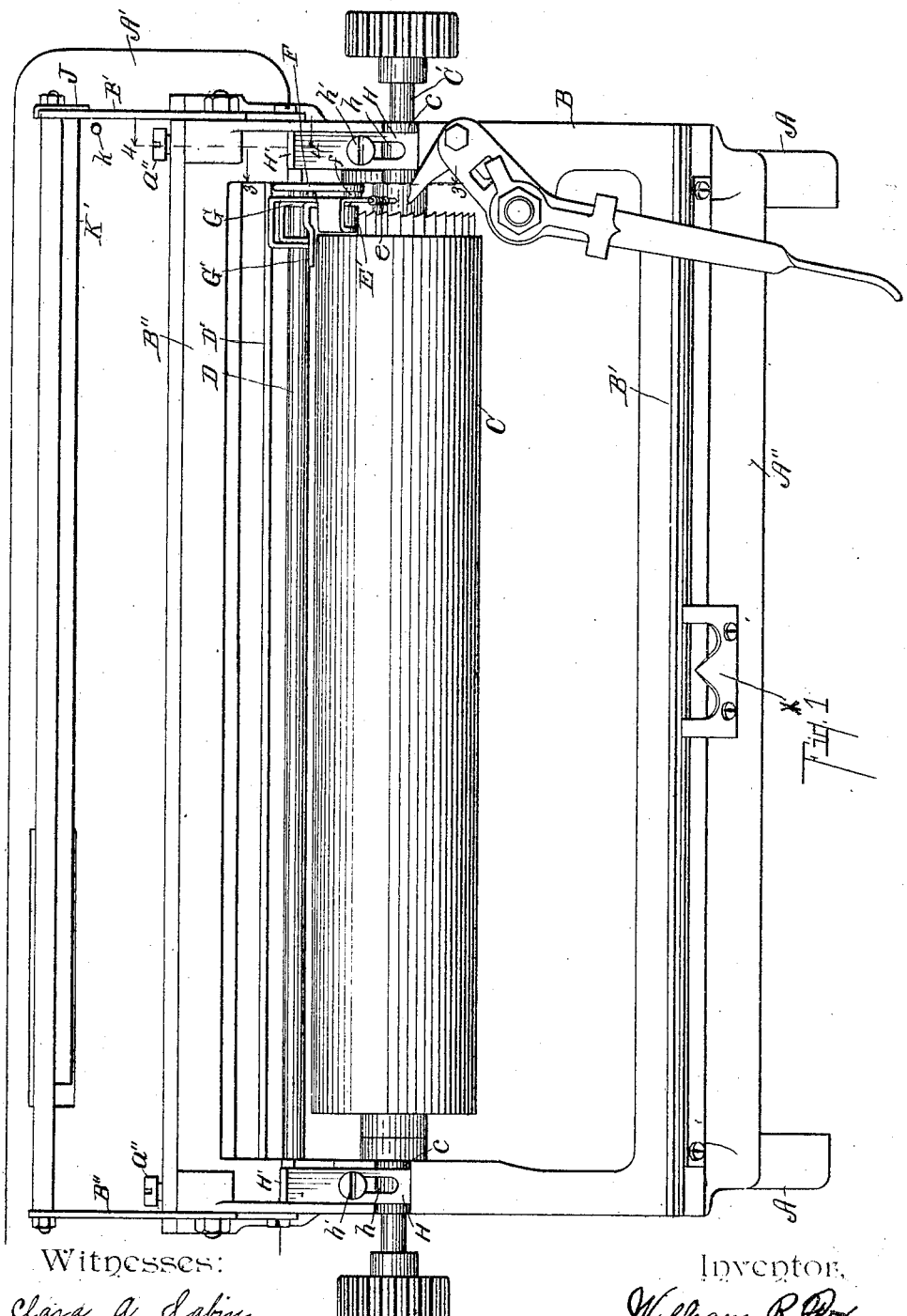

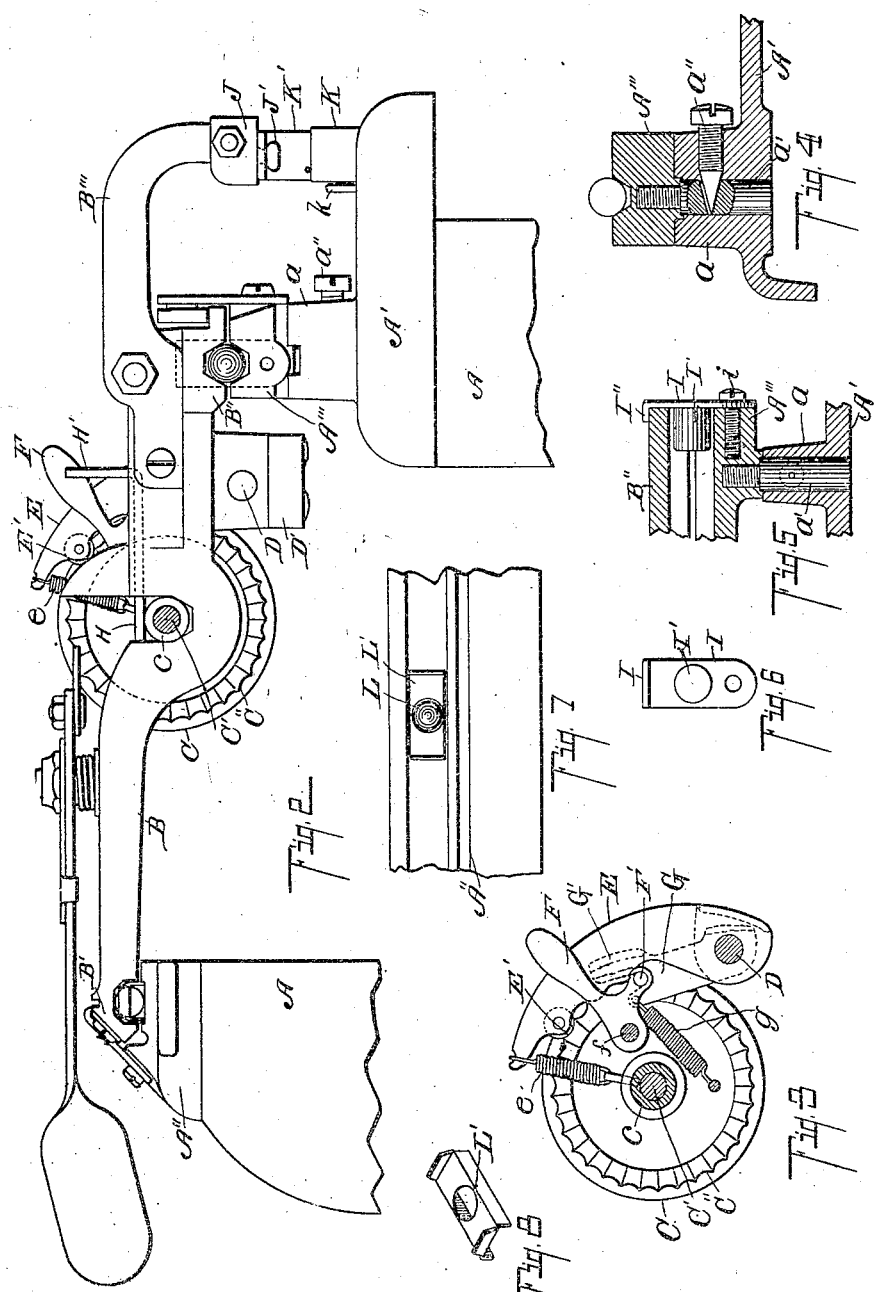

UNITED STATES PATENT OFFICE.

WILLIAM R. FOX, OF GRAND RAPIDS, MICHIGAN.

TYPE-WRITING MACHINE.

No. 863,372.

Specification of Letters Patent.

Patented Aug. 13, 1907.

Application filed April 23, 1906. Serial No. 313,296.

*To all whom it may concern:*

Be it known that I, WILLIAM R. FOX, a citizen of the United States, residing at Grand Rapids, county of Kent, State of Michigan, have invented certain new and useful Improvements in Type-Writing Machines, of which the following is a specification.

This invention relates to improvements in carriages for typewriting machines, particularly of the front-strike variety.

The objects of this invention are: first: to provide an improved construction of carriage in which the platen is readily detachable; second: to provide an improved means for attaching and detaching the carriage from the frame of the machine; third: to provide an improved construction of ways and ball retainers for carriages of typewriting machines; and fourth: to provide an improved construction of platen detent and brake.

Further objects and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing forming a part of this specification, in which—

Figure 1 is a plan view of the upper portion of a typewriter showing my improved carriage in position; Fig. 2 is an end elevation view of the structure appearing in Fig. 1, taken from the right-hand end of that figure, the platen twirler being removed; Fig. 3 is a detail sectional end elevation taken on line 3—3 of Fig. 1, showing details of platen detent and brake mechanism. Fig. 4 is an enlarged detail sectional view taken on line 4—4 of Fig. 1, showing the details of means for securing my improved carriage detachably to the machine. Fig. 5 is a detail sectional view taken on line 5—5 of Figs. 1 and 2, showing my improved carriage retainer device put in place to lock the carriage and ball ways together when the carriage is detached; Fig. 6 is a detail view of the said carriage retainer device; Fig. 7 is a detail view of my improved ball retainer in place; and Fig. 8 is a detail perspective view of said ball retainer.

In the drawing, the sectional views are taken looking in the direction of the little arrows at the ends of the section lines, and similar letters of reference refer to similar parts throughout the several views.

Referring to the lettered parts of the drawing: the main frame A of the machine is of the design of the improved Fox typewriters, provided with top plates A' A'' which support the carriage B. The carriage B is provided with a front bar B' provided with suitable broad flat ball race on the underside to correspond to a broad flat ball race on the top plate A'. These flat ball races are at the top and bottom respectively of broad grooves. The ball L is retained in place by the ball retainers L' made of sheet metal, the ends of which are turned upward and the sides of which are turned downward to loosely engage the broad grooves and to properly guide the ball within the said ball races, in said broad grooves.

A suitable pointer X is at the front of the machine, and is of the usual design, except that the screw holes are slotted to permit its ready removal in detaching the carriage.

The rear carriage bar B'' is fitted with a ball race of the grooved type, and a detachable bar A''' is secured on top of the top plate A' of the machine in which is formed a corresponding grooved ball race. The opposite ends of this plate A''' are provided with downward projecting pins $a'$ which are screw-threaded thereinto, and fit into, suitable sockets $a$ in the top plate A' of the machine. The pins $a'$ are provided with transverse tapered holes, and set screws $a''$, with tapered points, engage these tapered holes and draw the top plates securely down in position.

When it is desired to detach the carriage, caps I are secured to the top bar A''', plugs I' on said caps I extend therefrom into the ball race, the upper ends of the caps I being hooked at I'' to engage over the end of the bar B'' of the carriage. The caps are secured in place by the screws $i$ in the holes in the opposite ends of the top-bar A''', there being of course a similar cap at each end. The plugs I' are slightly larger than the balls and hold the parts sufficiently separated to prevent indenture of the ways or injury to the balls. I provide a pin $k$ on the top plate A' to which I attach the driving strap of the carriage, while making these changes. The strap K' is attached to the underside of the rear part of the carriage arm B''' on a bracket J which has a head J' projecting downward, as clearly appears in Figs. 1 and 2, when the same is used for driving the carriage. The upper portion of the spring-driven drum K also appears in Fig. 2.

The platen C is on the shaft C' which extends through a bushing $c$. Each end bar of the frame is notched, the notch being a part of a hexagon at the bottom to receive the bearing bushing $c$. A slide H is arranged in a suitable way on each end bar B, and is retained by a set screw $h'$ extending through a slot $h$ therein. The rear end of this slide H is upturned at H', affording a handle for manipulating the same. The front end of the slide H embraces the bushing $c$ securely, and forms a firm bearing for the ends of the shaft C'. It will be observed that the bushing can be firmly clamped by means of the set screw $h'$ through the slot $h$ in the slide H.

At the end of the platen roll is the lever for actuating the same and the ratchet means for retaining it, as well as the brake mechanism. The detent means consists of an arm E which is pivoted to the rod D and bears a roll e' which fits into curved notches around the periphery of the head of the platen. This arm E is urged into contact with the platen-head by the spring e, the inner end of which is secured to the bushing c. An arm G is also pivoted on the rod D and is provided with a brake-shoe G' for contacting with the face of the platen, the same being urged inwardly by the spring g. A lever F is pivoted at f on the head of the platen and is provided with a pin F' which engages suitable notches on the underside of the arm E and strikes into a notch on the end of the arm G so that by adjustment of the lever F the brake can be raised and the detent roller E' brought into engagement, or both the detent roll and the brake can be brought into engagement, or the brake be elevated and the detent roll be brought into action. In the position illustrated in the drawing, the brake is elevated and the detent roll E' engages the platen. By pulling the lever F one notch toward the front of the machine, both the brake and the detent pawl will be elevated and by swinging the lever one notch further forward, the detent roll E' will be elevated and the brake will be applied.

I desire to remark that the details of construction can be considerably varied without departing from my invention. Certain of the features might be omitted while others are being utilized, but I believe that the structures as I have shown them in detail will be found to be most effective in use.

Having thus described my invention, what I claim as new, and desire to secure by Letters Patent, is—

1. In a front strike typewriting machine, the combination of the main frame A with top plates A' A", the front plate A" having a suitable ball race on its top and the rear plate A' being provided with sockets a; a rear bar A'" detachably secured to the top plate A' by downwardly depending pins a' extending into the sockets a, the said pins being provided with laterally extending tapered holes; taper pointed set screws a" fitting into the holes in said pins a' to draw the top bar A'" securely against its seat, a typewriter carriage with front and rear rail and side bars B, the front and rear rails being provided with suitable ball races on their under surface, the ball race at the front being provided with a comparatively broad contact surface to permit free movement on the ball; a ball retainer L' of sheet metal, the longitudinal sides of which are turned down to fit into the sides of the lower part of the ball race and the ends of which are turned upwardly to be embraced by the upper portion of the ball race; clip pieces to join the rear rail B" of the carriage to the detachable top rail A'", consisting of plates I with hooks I" at the upper end to embrace the rear bar of the carriage, being provided with screws i for attaching the same to the rear bar of the frame; a detachable pointer on said typewriter frame extending over the said detachable carriage; the platen on a suitable spindle; bearing bushing embracing the spindle; a slide on the said bar of the carriage adjustable to embrace the bushing and retain the platen detachably upon said carriage; a shaft parallel with the said platen; a ratchet with curved notches on the end of said platen; an arm with a detent roller to rest in the notches of said ratchet; a spring connecting the said brake arm to the bushing on the platen spindle; a second arm carrying a suitable brake shoe to rest against the platen, having a notch in its end; a spring connected to said brake arm and to the carriage frame drawing the said brake arm normally toward the platen; a lever with a projecting pin arranged to engage both the detent arm and the brake arm at different points, whereby the adjustment of said lever regulates the brake on the detent so that both can be thrown out or both can be thrown in, or they may be brought into independent use, by the manipulation of said lever, co-acting for the purpose specified.

2. In a typewriting machine, the combination of the carriage supported by suitable means to reciprocate laterally across the machine, the end bars of which are suitably notched; the platen C on a suitable spindle; a bearing bushing embracing the spindle; a slide on the end bar of the carriage, adjustable to embrace the said bushing and retain the platen detachably upon the said carriage; a shaft parallel with the said platen; a ratchet with curved notches on the end of said platen; an arm with a detent roller to rest in the notches of said ratchet; a spring connecting the said arm to the bushing on the platen spindle; a second arm carrying a suitable brake shoe to rest against the platen, having a notch in its end; a spring connected to the said brake arm and to the carriage frame; drawing the said brake arm normally toward the platen; a lever with a projecting pin arranged to engage both the detent arm and the brake arm at different points, whereby the adjustment of said lever regulates the brake on the detent, so that both can be thrown out or both can be thrown in, or they may be brought into independent use by the manipulation of the said lever, co-acting for the purpose specified.

3. In a typewriting machine, the combination of the carriage supported by suitable means to reciprocate laterally across the machine, the end bars of which are suitably notched; the platen C on a suitable spindle; a shaft D parallel therewith; a detent arm E with detent roller E" pivoted on said shaft; a bushing on the platen spindle; a spring connecting the said bushing to the said detent arm; an arm G with a brake G' pivoted parallel with the detent arm, and notched at its outer end; a spring connecting the said brake arm to the frame; an operating lever F with a pin to engage both the said detent arms and the brake arms, whereby the manipulation of said levers effects the control of said brake arms and detent arm simultaneously and separately, co-acting for the purpose specified.

4. In a typewriting machine, the combination of the carriage supported by suitable means to reciprocate laterally across the machine, the end bars of which are suitably notched; the platen C on a suitable spindle; a shaft D parallel therewith; a detent arm E with detent roller E" pivoted on said shaft; a spring for holding the said detent arm to its work; an arm G with a brake G' pivoted parallel with the detent arm, and notched at its outer end; a spring connecting the said brake arm to the frame; an operating lever F with a pin to engage both the said detent arms and the brake arms, whereby the manipulation of said levers effects the control of said brake arms and detent arm simultaneously and separately, co-acting for the purpose specified.

5. In a carriage for a typewriting machine, the combination of the carriage; suitable front and rear ball races formed in the said carriage and in the frame of the machine to correspond thereto, the rear of which races are V-grooved to embrace the balls and insure straight reciprocation, the front races of which are respectively provided with broad flat parallel contact surfaces in broad grooves; and a ball retainer formed of sheet metal in the front races, the longitudinal sides of which are bent downwardly to enter the lower ball race groove and fit therein loosely and the ends of which are bent upwardly to enter the upper ball race groove and fit therein loosely, co-acting for the purpose specified.

6. In a carriage for a typewriting machine, the combination with the main typewriter frame, of a carriage which at one side of the carriage and the corresponding side of the main frame is provided with ball races with beveled sides to embrace the balls, the opposite sides of said carriage and corresponding part of the main frame being provided with ball races the bottoms of which are broad flat opposing surfaces on parallel planes; a ball in said race and a ball retainer embracing the ball and fitting loosely within the broad groove to keep the ball properly directed in its course on the broad bottoms of the said ball races, as specified.

7. In a typewriting machine, the combination of the carriage ways on the typewriting frame, one of which is supported in a detachable part or bar; downwardly depending pins on the said detachable bar, fitting into suitable sockets; and laterally arranged set screws, with tapering points to fit with a draw fit into holes in the said pins, for joining the said detachable bar securely to the frame.

8. In a typewriting machine, the combination of the carriage ways on the typewriting frame, one of which is supported in a detachable part or bar; downwardly depending pins on the said detachable bar, fitting into suitable sockets; and laterally arranged set screws for joining the said detachable bar securely to the frame.

9. In a typewriting machine, the combination of a frame; a detachable rail thereon, having a ball race formed therein; a carriage frame having an oppositely faced corresponding ball race; a clamp for joining the carriage to the detachable rail provided with a pin larger than the balls within the race for insertion between the carriages and the detachable rail, co-acting for the purpose specified.

10. In a typewriting machine, the combination of a frame; a detachable rail thereon, having a ball race formed therein; a carriage frame having an oppositely faced corresponding ball race; a clamp for joining the carriage to the detachable rail provided with a pin for insertion between the carriages and the detachable rail, co-acting for the purpose specified.

In witness whereof, I have hereunto set my hand and seal in the presence of two witnesses.

WILLIAM R. FOX. [L. S.]

Witnesses:
  KATHARINE KUNZI,
  CAROLINE D. WATERMAN.